(No Model.)
I. SHONDY, Jr. & D. W. SHONDY.
RAILWAY JACK.
No. 262,839. Patented Aug. 15, 1882.
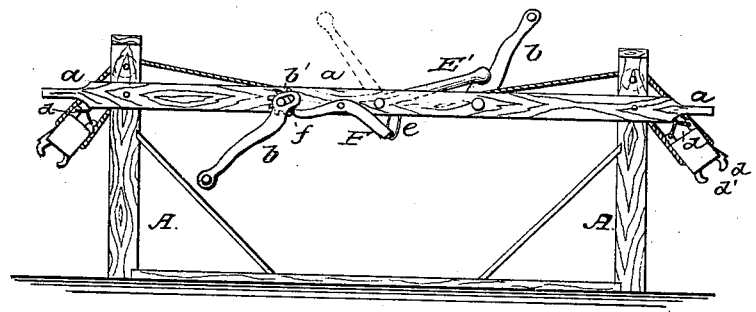
FIG. 1
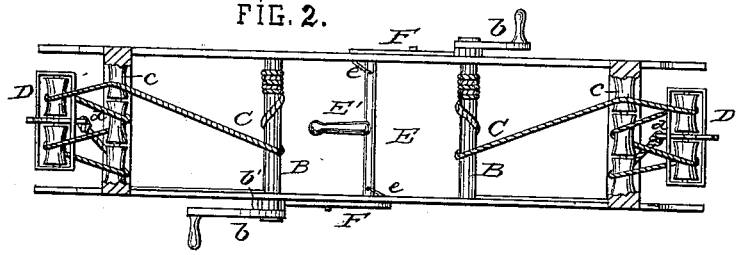
FIG. 2.
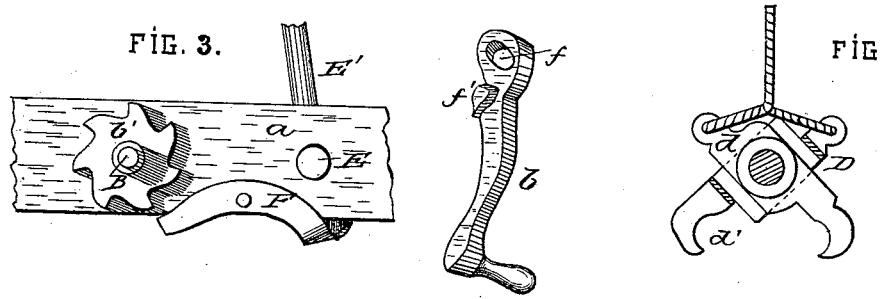
FIG. 3. FIG. 4.
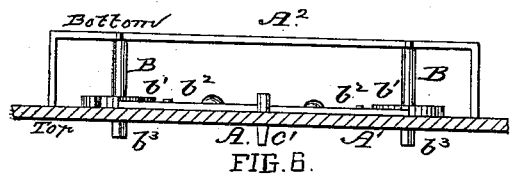
FIG. 5.
FIG. 6.
WITNESSES:
Fred. G. Dieterich
Jno. A. Madigan
Israel Shondy Jr
Daniel W. Shondy
INVENTORS,
by Louis Bagger & Co
ATTORNEYS.

UNITED STATES PATENT OFFICE.

ISRAEL SHONDY, JR., AND DANIEL W. SHONDY, OF PAW PAW GROVE, ILLINOIS.

RAILWAY-JACK.

SPECIFICATION forming part of Letters Patent No. 262,839, dated August 15, 1882.

Application filed June 17, 1882. (No model.)

*To all whom it may concern:*

Be it known that we, ISRAEL SHONDY, Jr., and DANIEL W. SHONDY, of Paw Paw Grove, in the county of Lee and State of Illinois, have invented certain new and useful Improvements in Railway-Jacks; and we do hereby declare that the following is a full, clear, and exact description of the invention, which will enable others skilled in the art to which it appertains to make and use the same, reference being had to the accompanying drawings, which form a part of this specification, and in which—

Figure 1 is a side elevation of our improved railroad-track jack. Fig. 2 is a plan view thereof with the modified form of the same removed. Figs. 3 and 4 are enlarged detail views of the windlass handle or crank and the combined pulley-block and dog, respectively. Fig. 5 is a detailed side view, and Fig. 6 is a similar inverted view, of the modification.

This invention has relation to improvements in jacks adapted especially for use in ballasting railroad-tracks; and it consists in the combination and arrangement of parts, substantially as hereinafter more fully set forth and claimed.

In carrying out our invention we construct an upright frame, A, provided with handled side bars, $a\ a$, for its convenient removal, and further utilized, as presently seen. Hung in the side bars, $a$, one arranged upon each side of a central point thereof, are two rolls or cylinders, B, having cranks or handles $b$ upon opposite ends or opposite sides of the frame A for convenience of operation. Upon these cylinders or rolls B are ratchets $b'$, arranged outside of the side bars, $a$. To each of these rolls is fastened a rope or chain, C, passed over pulleys $c$, hung in the upper end of the frame A. This arrangement of pulleys is duplicated at each end of the frame. The rope is next passed over pulleys in pulley-block D, and adapted to be attached to the block and to a dog upon said block.

$d$ is the dog, fulcrumed upon the axis of the pulleys of the block D, and having its toothed end capable of co-operating with a toothed projection or bar, $d'$, of the pulley-block. It will be observed that when the rope or chain is drawn tightly it will draw upon the dog and cause it to close against the tooth $d'$ of the pulley-block D, providing a means for grasping the rail of the track to be elevated.

E is a shaft hung in the side bars, $a$, of the frame A, and having a handle, E', to permit its operation.

F F are pawls arranged or hung upon opposite sides of the frame-bars $a$, and adapted to engage one with the ratchet of one roll or cylinder and the other with the ratchet of the other roll or cylinder by gravity. These pawls are connected by cords or chains $e$ to opposite ends of the handled shaft E to enable, at the same or one operation, the taking the pawls F F off the ratchets of the cylinders or rolls when it is desired to lower the elevated or suspended track or weight.

It will be observed that the handles $b$ are not fast upon the cylinders B, and have slots $f$ and teeth $f'$. The latter enable the handles to be connected with the ratchets of the cylinders to effect the operation of the cylinders. The former permit the disengagement of the handles from the said ratchets to enable them to hang loosely upon the shafts of the cylinders and prevent them from flying around and striking any one as the rope or chain is uncoiled in lowering the weight or track.

This device can be used to raise from one to three tracks, when fastened to the same ties, at one operation by multiplying the pulley-blocks for each additional track. It may therefore form a " single" or "double" jack, as we would term it, according to the number of pulleys used.

In the modification shown in Figs. 5 and 6 the device is adapted to operate vertically, or in an opposite manner to that in which it operates as above set forth. In its modified form the device or jack consists of the shafts or rolls B, arranged in a vertical position, and having their ratchets $b'$ engaged by horizontally-disposed spring-pawls $b^2$. The rolls B bear in a top board, A', adapted to be removed from the frame A, and in a bracket, $A^2$, depending from the board A'. The upper ends of the roll-shafts have removable handles or cranks $b^3$ for their operation. The spring-pawls $b^2$ are arranged to cause their inner ends to meet, and are capable of being acted on by a lever, $c'$, hung in the board $A'$.

We claim and desire to secure by Letters Patent of the United States—

1. In a jack for elevating railroad-tracks or other weights, the combination of the rolls or shafts having ratchets held in engagement with gravity or spring pawls, the loose handles or cranks capable of engagement with or disengagement from the aforesaid rolls or shafts, and the upright supporting-frame, substantially as and for the purpose set forth.

2. In a jack, the combination, with the windlass-cylinders and their ropes or chains, of the pulley-blocks having a grappling-hook or toothed projection, and the dogs pivoted upon said blocks, substantially as and for the purpose set forth.

3. In a jack, the combination, with the windlass-cylinders having ratchets, of the cranks or handles having each a slot, $f$, and a tooth, $f'$, substantially as and for the purpose set forth.

In testimony that we claim the foregoing as our own we have hereunto affixed our signatures in presence of two witnesses.

ISRAEL SHONDY, Jr.
DANIEL W. SHONDY.

Witnesses:
I. H. PULVER,
W. A. PRATT.